(12) United States Patent
Yamana

(10) Patent No.: US 11,190,691 B2
(45) Date of Patent: Nov. 30, 2021

(54) IMAGE PICKUP APPARATUS

(71) Applicant: CANON KABUSHIKI KAISHA, Tokyo (JP)

(72) Inventor: Kazuaki Yamana, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/021,082

(22) Filed: Sep. 15, 2020

(65) Prior Publication Data

US 2021/0092273 A1 Mar. 25, 2021

(30) Foreign Application Priority Data

Sep. 19, 2019 (JP) .............................. JP2019-170236

(51) Int. Cl.
*H04N 5/232* (2006.01)

(52) U.S. Cl.
CPC ................................ *H04N 5/2328* (2013.01)

(58) Field of Classification Search
CPC .... H04N 5/2328; G02B 27/64; G02B 27/646; G03B 2205/0007
See application file for complete search history.

(56) References Cited

U.S. PATENT DOCUMENTS

| | | | | |
|---|---|---|---|---|
| 9,584,709 B2* | 2/2017 | Garcia | ................. | H04N 5/2254 |
| 10,750,096 B2* | 8/2020 | Sharma | ................ | G02B 27/646 |
| 2011/0097062 A1* | 4/2011 | Tsuruta | ................ | G02B 27/646 |
| | | | | 396/55 |
| 2012/0075700 A1* | 3/2012 | Ezawa | ..................... | G03B 5/00 |
| | | | | 359/554 |
| 2012/0268642 A1* | 10/2012 | Kawai | .................. | G02B 27/646 |
| | | | | 348/335 |
| 2013/0242181 A1* | 9/2013 | Phoon | .................. | H04N 5/2253 |
| | | | | 348/374 |
| 2014/0091204 A1* | 4/2014 | Ezawa | ..................... | G03B 5/00 |
| | | | | 250/208.1 |
| 2016/0097937 A1* | 4/2016 | Lam | ......................... | G02B 7/09 |
| | | | | 359/557 |
| 2016/0241761 A1* | 8/2016 | Garcia | ................. | H04N 5/2257 |
| 2016/0306185 A1* | 10/2016 | Hu | ........................ | H04N 5/2254 |
| 2017/0094187 A1* | 3/2017 | Sharma | ................ | G02B 27/646 |
| 2017/0280036 A1* | 9/2017 | Morinaga | ............ | H04N 5/2328 |
| 2017/0371127 A1* | 12/2017 | Murakami | ............. | H04N 5/232 |
| 2018/0157156 A1* | 6/2018 | Yamada | ............... | H04N 9/3188 |
| 2018/0284568 A1* | 10/2018 | Oh | .......................... | G03B 5/00 |
| 2018/0356609 A1* | 12/2018 | Kim | ....................... | G03B 13/34 |

(Continued)

FOREIGN PATENT DOCUMENTS

JP 2000214508 A 8/2000

*Primary Examiner* — Pritham D Prabhakher
(74) *Attorney, Agent, or Firm* — Cowan, Liebowitz & Latman, P.C.

(57) ABSTRACT

An image pickup apparatus includes an image sensor configured to capture an object image, an image stabilizing unit that includes a coil, a magnet that faces the coil, and a yoke that contacts the magnet, and moves the image sensor for an image stabilization by electrifying the coil, and a magnetic flux shielding member made of a magnetic material and disposed in an area between the image stabilizing unit and an exterior surface of the image pickup apparatus, through which a magnetic flux generated from the magnet moves toward outside of the image pickup apparatus.

12 Claims, 7 Drawing Sheets

(56) References Cited

U.S. PATENT DOCUMENTS

| | | | |
|---|---|---|---|
| 2019/0196139 A1* | 6/2019 | Lee | G02B 27/646 |
| 2019/0364217 A1* | 11/2019 | Sharma | H04N 5/2257 |
| 2020/0057242 A1* | 2/2020 | Osaka | G02B 7/09 |
| 2020/0260011 A1* | 8/2020 | Sasaki | G02B 7/08 |

* cited by examiner

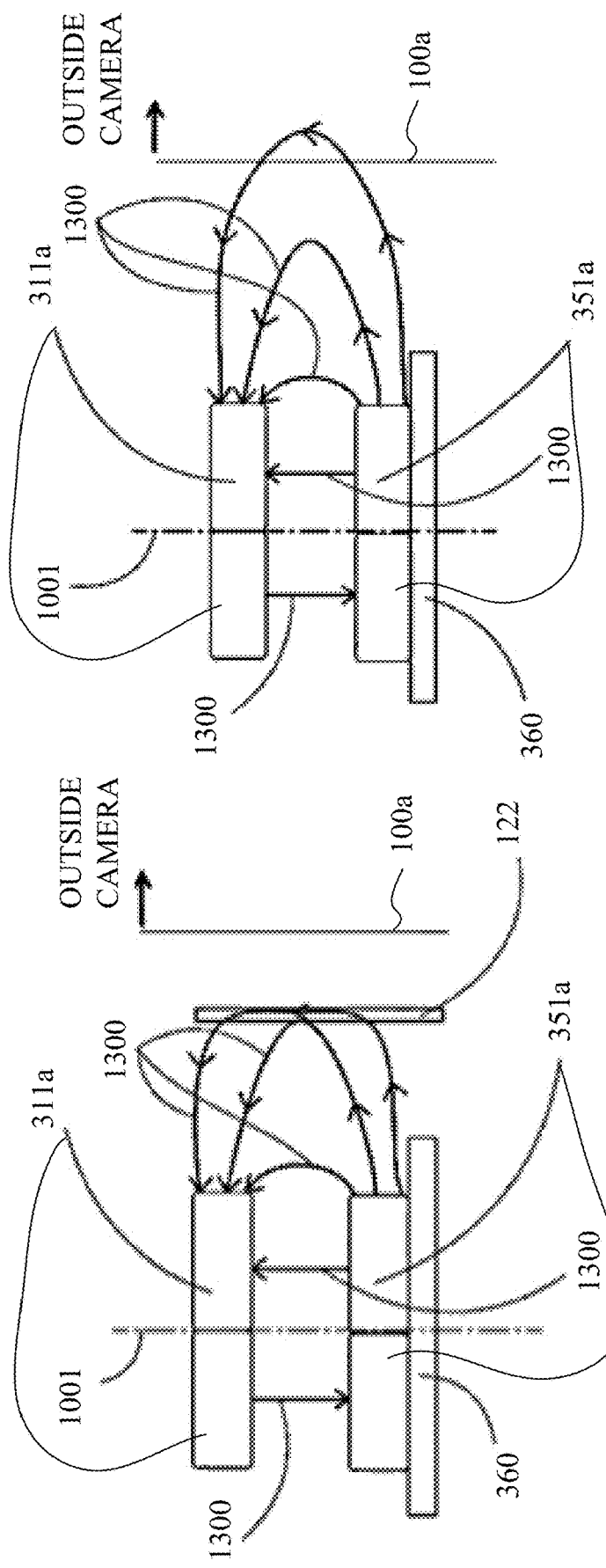

IMAGE PICKUP APPARATUS

BACKGROUND OF THE INVENTION

Field of the Invention

The present invention relates to an image pickup apparatus that drives an optical element using a magnet.

Description of the Related Art

Some image pickup apparatuses provide an image stabilization (or correct image blurs) by moving an optical element using an electromagnetic actuator. Japanese Patent Laid-Open No. ("JP") 2000-214508 discloses a configuration that electrifies a coil to relatively move a coil and a magnet facing it and to move an image-stabilizing optical element.

However, if the magnetic flux generated from the magnet leaks to the outside through the exterior of the image pickup apparatus, foreign matters such as dust containing magnetic materials may be attracted to the image pickup apparatus.

SUMMARY OF THE INVENTION

The present invention provides an image pickup apparatus that can suppressing magnetic-flux leaks to the outside generated by a magnet.

An image pickup apparatus according to one aspect of the present invention includes an image sensor configured to capture an object image, an image stabilizing unit that includes a coil, a magnet that faces the coil, and a yoke that contacts the magnet, and moves the image sensor for an image stabilization by electrifying the coil, and a magnetic flux shielding member made of a magnetic material and disposed in an area between the image stabilizing unit and an exterior surface of the image pickup apparatus, through which a magnetic flux generated from the magnet moves toward outside of the image pickup apparatus.

Further features of the present invention will become apparent from the following description of exemplary embodiments with reference to the attached drawings.

BRIEF DESCRIPTION OF THE DRAWINGS

FIGS. 6A and 6B are partially sectional views of the conventional camera and the camera according to the embodiment.

DESCRIPTION OF THE EMBODIMENTS

Figure 1A:
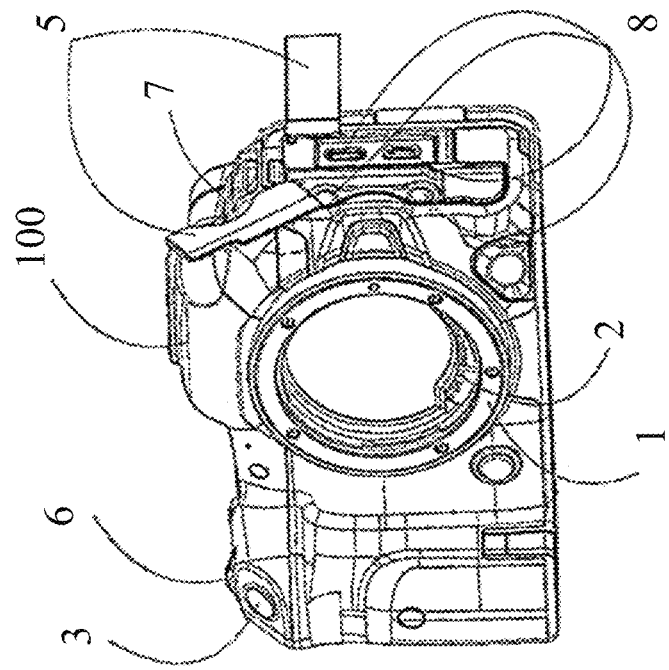
FIGS. 1A and 1B are external views of a camera according to one embodiment according to the present invention.
Figure 1B:
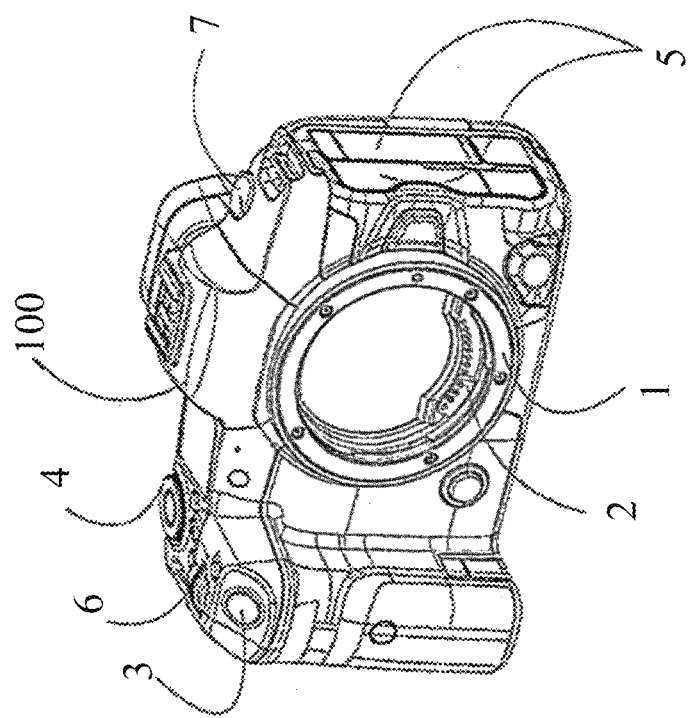

Referring now to the accompanying drawings, a description will be given of embodiments according to the present invention. FIGS. 1A and 1B illustrate a lens interchangeable digital camera (simply referred to as a camera hereinafter) 100 serving as an image pickup apparatus according to one embodiment of the present invention when viewed obliquely from an object side (front side), and FIG. 1B illustrates the camera 100 with a connector cover 5 opening. A lens integrated camera is also included in another embodiment of the present invention.

On the front surface of the camera 100, there is provided a mount 1 on which an interchangeable lens (not illustrated) is detachably mounted. An electric terminal unit 2 for supplying the power to the mounted interchangeable lens and for communicating with the interchangeable lens is provided on the inner periphery of the mount 1.

On the upper right side (left side in the figure) of the camera 100, a shutter button 3 is provided which is operated by a user to instruct imaging. On the upper part of the camera 100, the mode switch 4 for the user to set one of various imaging modes, an electronic dial 6 for changing set values such as a shutter speed and an F-number (aperture value), and a power switch 7 for powering on and off the camera 100.

A connector cover 5 is provided on the left side (right side in the figure) of the camera 100 so that it can open and close. As illustrated in FIG. 1B, the connector cover 5 is a cover that protects a plurality of interface connectors (external connection terminals: simply referred to as connectors hereinafter) 8 to which cables extending to external devices (not illustrated) are connected.

Figure 2:
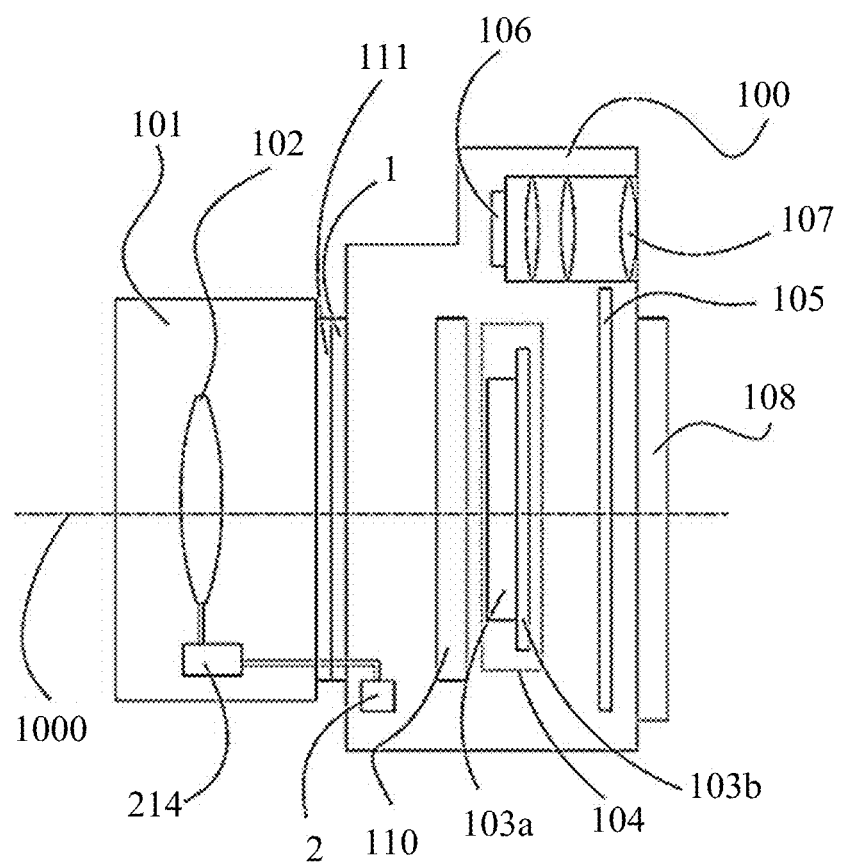
FIG. 2 is a sectional view illustrating an internal configuration of the camera according to the embodiment.

FIG. 2 illustrates the internal configuration of the camera 100. This figure illustrates a state in which an interchangeable lens 101 is attached to the camera 100. The interchangeable lens 101 holds an imaging optical system 102 including a plurality of lenses (although illustrated as a single lens in the figure) such as a focus lens and an aperture stop (diaphragm) (not illustrated). A lens controller 214 in the interchangeable lens 101 communicates with a camera controller (not illustrated) in the camera 100 via the electric terminal unit 2 described above.

In the camera 100, an image sensor 103a including a CCD sensor, a CMOS sensor, etc. is mounted on the front surface of an imaging board 103b. The image sensor 103a photoelectrically converts (images) the object image formed by the imaging optical system 102 and outputs an image signal. On the back surface of the imaging board 103b, a main board (electric circuit board) 105 is provided which performs image processing for an image signal to generate image data and various processing relating to the operation of the camera 100. The imaging board 103b and the main board 105 are electrically connected by a connecting substrate (not illustrated).

The camera 100 houses a shutter unit 110 that controls the exposure time of the image sensor 103a. The camera 100 has an image stabilizing unit 104 that moves the image sensor 103a (and the imaging substrate 103a) in a direction orthogonal to an optical axis 1000 of the imaging optical system 102. The image stabilizing unit 104 has a fixed part 104b and a movable part 104a, which will be described in detail later.

Provided on the upper part of the camera 100 are a viewfinder display element 106 that displays an image corresponding to an image signal and information on image pickup, and an eyepiece 107 that allows the user to observe the image displayed on the viewfinder display element 106. Provided on the rear surface of the camera 100 is a rear display 108 that displays an image corresponding to the image data and information on the image pickup (such as an F-number (aperture value), a shutter speed, and an ISO speed). By viewing the viewfinder display element 106 and the rear display 108, the user can confirm an imaging composition, a captured image, and information on the image pickup.

The camera 100 further includes a recording medium slot (not illustrated) that detachably holds a recording medium for recording image data.

Figure 3:
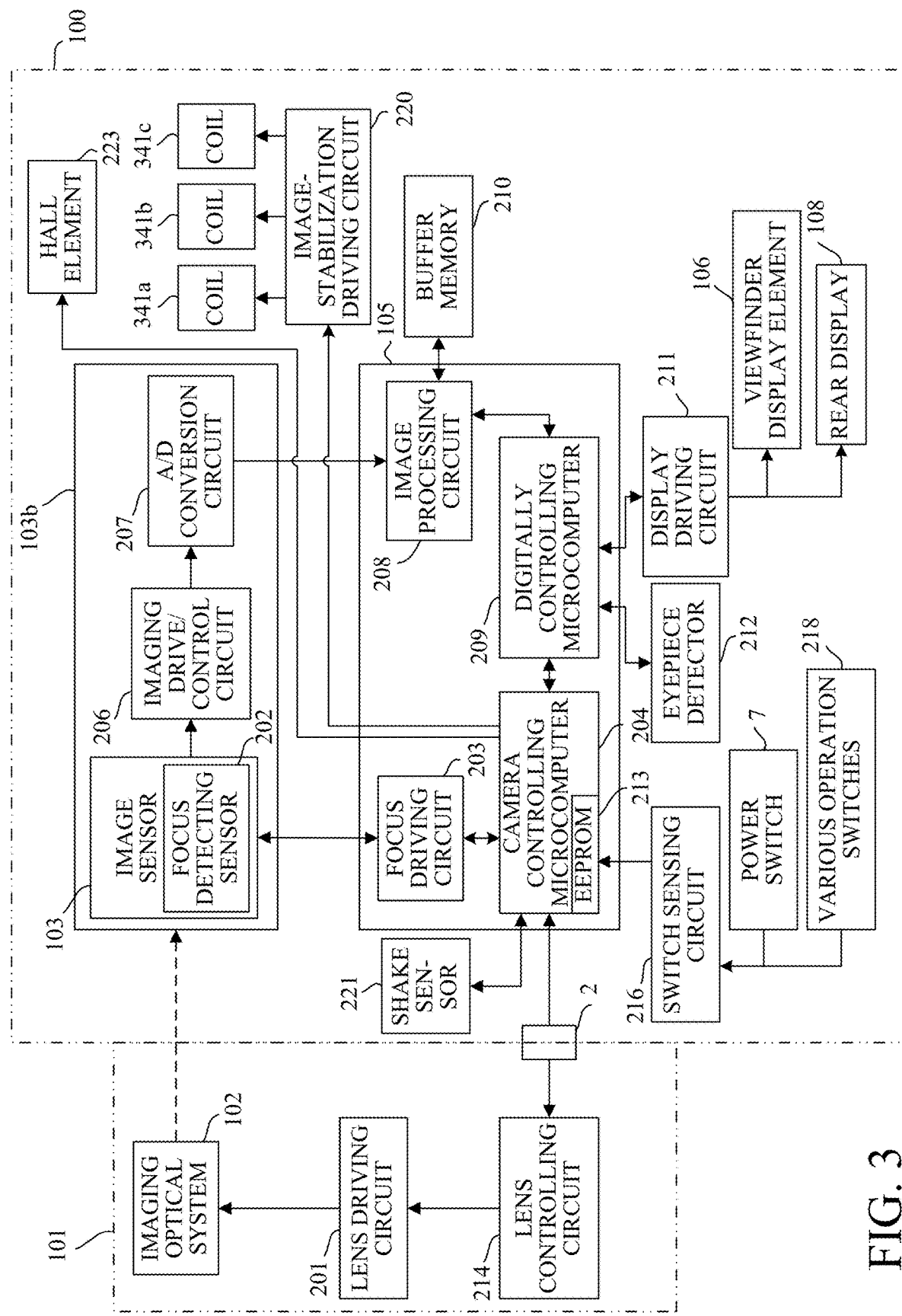
FIG. 3 is a block diagram illustrating an electrical configuration of the camera according to the embodiment.

FIG. 3 illustrates electrical configurations of the camera 100 and the interchangeable lens 101. The interchangeable lens 101 has a lens driving circuit 201 that drives the focus lens and the aperture stop in the imaging optical system 102, and a lens controlling circuit 205 that controls driving the focus lens and the aperture stop through the lens driving circuit 201.

In the camera 100, the focus detecting sensor 202 is built in the image sensor 103*a* mounted on the imaging board 103*b* as described above. The focus detecting sensor 202 detects a focus by a phase difference detecting method. The focus detecting signal (paired image signals) output from the focus detecting sensor 202 is sent to the focus driving circuit 203 mounted on the main board 105. The focus driving circuit 203 calculates a phase difference between the focus detecting signals, calculates a defocus amount based on the phase difference, further calculates the focus lens driving amount based on the defocus amount, and sends it to a camera controlling microcomputer 204. The camera controlling microcomputer 204 sends a focus driving command including a driving amount of the focus lens to the lens controlling circuit 205. The lens controlling circuit 205 controls the lens driving circuit 201 to move the focus lens by the received driving amount for autofocusing.

The camera controlling microcomputer 204 controls the power supply to three coils 341*a*, 341*b* and 341*c* (which will be described later in detail) provided in the image stabilizing unit 104 through an image-stabilization driving circuit 220. The camera 100 includes a shake sensor 221 that detects shakes of the camera 100 (referred to as camera shakes hereinafter) caused by manual shakes of the user etc. and outputs a shake signal. The camera controlling microcomputer 204 can reduce (correct) image blurs caused by the camera shakes by controlling the power supply to the coils 341*a*, 341*b*, and 341*c* according to the shake signal.

During image pickup, the camera controlling microcomputer 204 sends a aperture-stop driving command to the lens controlling circuit 205 to drive the aperture stop, and controls the shutter unit 110 to expose the image sensor 103*a* for a predetermined time.

The imaging drive/control circuit 206 mounted on the imaging board 103*b* causes the image sensor 103*a* to accumulate electric charges, reads the imaging signal generated by the charge accumulations from the image sensor 103*a*, and sends it to an A/D conversion circuit 207. The A/D conversion circuit 207 converts the input imaging signal as an analog signal into a digital imaging signal and sends it to an image processing circuit 208 on the main board 105. The image processing circuit 208 performs various image processing for the digital imaging signal and generates image data. The image data is stored in a buffer memory 210 or displayed on the viewfinder display element 106 or the rear display 108 through the display driving circuit 211.

An eyepiece detector 212 detects that the user is observing the viewfinder display element 106 by emitting infrared light and receiving the reflected light from the user looking through the eyepiece 107 illustrated in FIG. 2. A signal indicative of the detected state by the eyepiece detector 212 is input to a digitally controlling microcomputer 209, and the digitally controlling microcomputer 209 switches between a display on the viewfinder display element 106 and a display on the rear display 108 according to the detected state.

A switch sensing circuit 216 detects a user operation on various operation members such as the mode switch 4, the electronic dial 6, and the power switch 7 illustrated in FIGS. 1A and 1B, and a touch sensor provided on the rear display 108, and sends a detection signal to the camera controlling microcomputer 204. The camera controlling microcomputer 204 performs operations, processing, and settings in accordance with the detection signal from the switch sense circuit 216. Various set values are recorded in an EEPROM 213 in the camera controlling microcomputer 204.

Figure 4B:
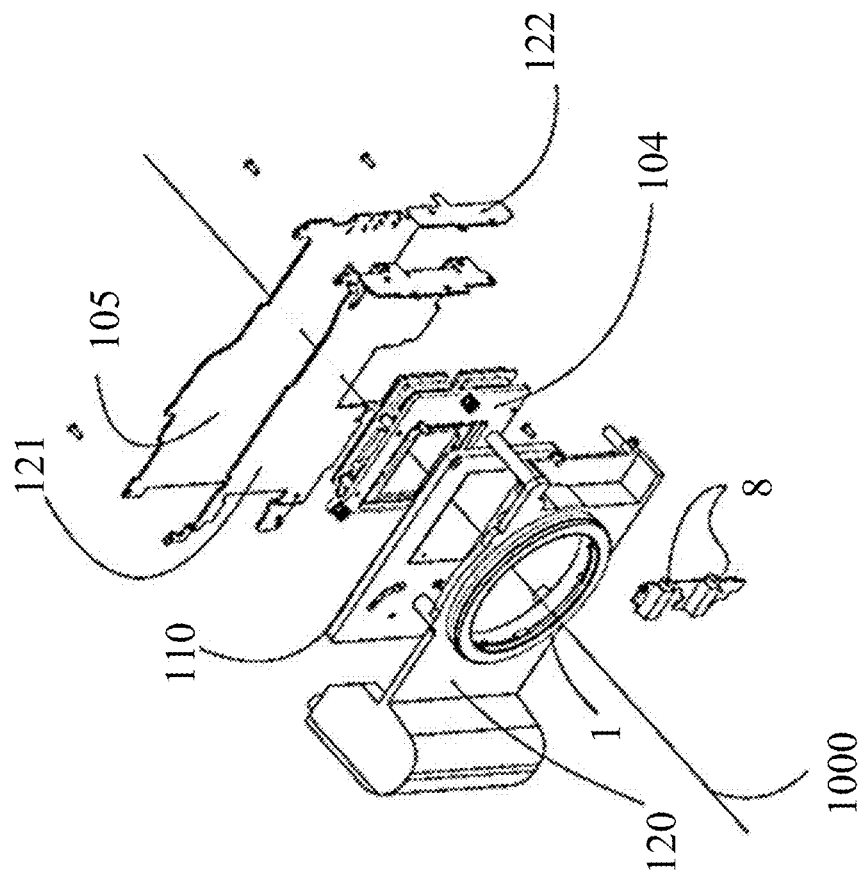
FIGS. 4A and 4B are exploded perspective views of the camera according to the embodiment.
Figure 4A:
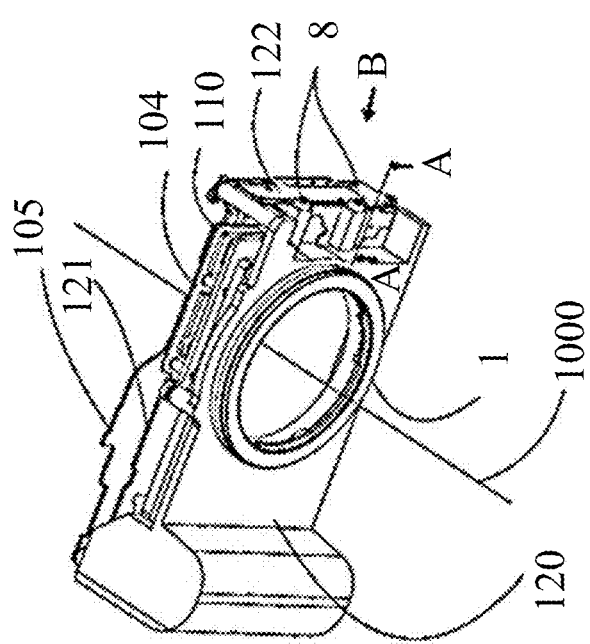
Figures 5A, 5B:
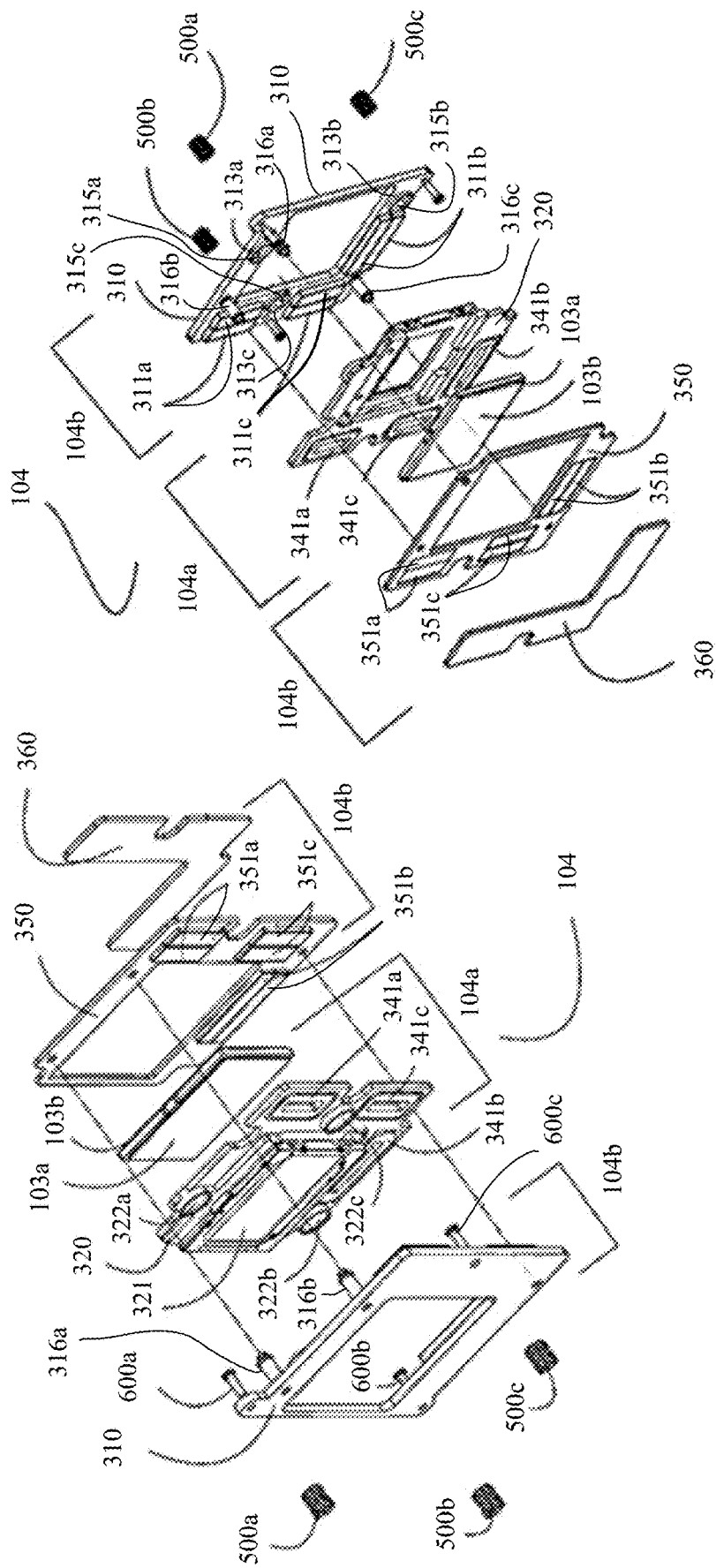
FIGS. 5A and 5B are exploded perspective views of an image stabilizing unit mounted on the camera according to the embodiment.

FIG. 4A illustrates part of the camera 100, and FIG. 4B is an exploded view of the camera 100. These figures illustrate the main board 105, the image stabilizing unit 104, the shutter unit 110, and a base member 120. FIGS. 5A and 5B are exploded views of the image stabilizing unit 104 viewed from the front side and the rear side.

The mount 1 described above is fixed to the base member 120. The image stabilizing unit 104 is supported by the base member 120 to which the shutter unit 110 is assembled and fixed, and displaceable in a direction in which the optical axis 1000 extends (optical axis direction). More specifically, as illustrated in FIGS. 5A and 5B, the image stabilizing unit 104 includes three screws 600*a*, 600*b*, and 600*c* inserted into three holes in a front yoke 310, and are inserted and three coil springs 500*a*, 500*b*, and 500*c* disposed on the outer circumferences of these three screws 600*a*, 600*b* and 600*c*, and the tip of each screw is fastened to the base member 120. By adjusting a fastening amount of each screw, the slope of the imaging plane of the image sensor 103*a* can be adjusted relative to the base member 120, and the adjusted image stabilizing unit 104 is fixed in the optical axis direction.

In FIGS. 4A and 4B, an unillustrated flexible printed circuit board extending from the image stabilizing unit 104 is connected to the main circuit board 105. Thereby, the main board 105 and the coils 341*a*, 341*b*, and 341*c* are electrically connected to each other. A heat diffusing member 121 is disposed between the main board 105 and the image stabilizing unit 104, and attached to the base member 120 together with the main board 105. The heat diffusing member 121 is made of a material having a high thermal conductivity such as aluminum, and diffuses the heat generated in the main board 105.

The magnetic flux shielding member 122 is a thin plate member, and attached to the bent side surface of the heat diffusing member 121 so as to be parallel to connection opening surfaces of the connectors 8. The magnetic flux shielding member 122 is made of a magnetic material such as iron or ferritic stainless steel. The magnetic flux shielding member 122 is grounded via the heat diffusing member 121.

In FIGS. 5A and 5B, the image stabilizing unit 104 has a fixed part 104*b* and a movable part 104*a* that is movably supported relative to the fixed part 104*b* in a direction orthogonal to the optical axis 1000. The movable part 104*a* includes the image sensor 103*a* mounted on the imaging board 103*b*, a low-pass filter 321 that prevents infrared light from entering the image sensor 103*a* and restrains color moiré, a sensor holder 320 that hold them, and three coils 341*a*, 341*b*, and 341*c* fixed to the sensor holder 320. The fixed part 104*b* includes the front yoke 310, the base plate 350, and the rear yoke 360 described above, and is fixed to the base member 120 after the inclination of the imaging plane is adjusted.

Ball receivers 322*a*, 322*b*, and 322*c* are formed at three locations on the sensor holder 320. Ball receivers 313*a*, 313b, and 313c are formed in the front yoke 310 at positions facing ball receivers 323a, 322b, and 323c. The balls 313a, 313b, and 313c are disposed between the ball receivers (322a and 323a, 322b and 323b, 322c and 323c) opposite to each other.

Magnets 311a, 311b, and 311c are fixed at three locations on the front yoke 310 which face the coils 341a, 341b, and 341c fixed to the sensor holder 320. An unillustrated magnetic plate member made of a magnetic material such as iron is fixed to the sensor holder 320 at a position facing the magnets 311a, 311b, and 311c. When the front yoke 310 and the sensor holder 320 are located closer to each other, the sensor holder 320 is biased toward the front yoke 310 by the forces of the magnets 311a, 311b, and 311c attracting the magnetic plate member, and the ball receivers (322a and 323a, 322b and 323b, and 322c and 323c) opposite to each other sandwich the balls 313a, 313b, and 313c. Thereby, the movable part 104a is positioned in the optical axis direction relative to the fixed part 104b, and can smoothly move in a direction orthogonal to the optical axis 1000 due to rolling of the balls 313a, 313b, and 313c.

The magnets 351a, 351b, and 351c are fixed to the base plate 350 at three locations facing the coils 341a, 341b, and 341c fixed to the sensor holder 320. The rear yoke 360 is fixed to the rear surfaces of these magnets 351a, 351b, and 351c. Both the rear yoke 360 and the base plate 350 are made of a magnetic material.

Props 316a, 316b, and 316c extending toward the rear base plate 350 are provided at three locations on the front yoke 310. One end of each prop is pressed into a hole formed in the base plate 350. Thereby, the front yoke 310 and the base plate 350 are joined together so as to sandwich the sensor holder 320, and the coils 341a, 341b, and 341c are disposed in the magnetic fields formed by the magnets 311a, 311b, and 311c fixed to the front yoke 310 and the magnets 351a, 351b, and 351c fixed to the base plate 350. When a current flows through the coils 341a, 341b, and 341c, a Lorentz force acts on each coil in a direction orthogonal to the optical axis 1000. Thereby, the sensor holder 320 (or the image sensor 103b) can be moved within a plane orthogonal to the optical axis 1000 (referred to as a sensor moving plane hereinafter). More Specifically, when the coils 341a and 341c are electrified, the sensor holder 320 moves in the horizontal direction (in which the long side of the image sensor 103b extends) in the sensor moving plane, and the sensor holder 320 moves in the vertical direction (in which the short side of the image sensor 103b extends) on the sensor moving plane when the coil 341b is electrified.

A Hall element 223 illustrated in FIG. 3 is disposed inside at least one of the coils 341a, 341b, and 341c in the sensor holder 320. The Hall element 223 detects a change in magnetic force as the sensor holder 320 moves together with the coils 341a, 341b, and 341c relative to the magnets 311a, 311b, and 311c. The camera controlling microcomputer 204 can detect a moving amount of the movable part 104a relative to the fixed part 104b in two directions orthogonal to the optical axis 1000 by using the detection signal from the Hall element 223.

Thus, the image stabilizing unit 104 moves the movable part 104a using the magnetic field generated between the magnets 311a, 311b, and 311c and the magnets 351a, 351b, and 351c provided in the camera 100. If the magnetic flux forming this magnetic field leaks to the outside of the camera 100, foreign matter such as magnetic dust and dirt may be attracted. When the connector cover 5 is removed from the camera 100 and the connector 8 is exposed, magnetic foreign matters may enter the camera 100 from their peripheries.

FIG. 6A illustrates a section of the camera 100 of this embodiment taken along the line A-A illustrated in FIG. 4A. FIG. 6B illustrates the same section as that in FIG. 6A in the conventional camera having the image stabilizing unit 104. In FIG. 6B, only the rear yoke 360, the magnet 311a, and the rear yoke 360 are illustrated, and in addition to them, the magnetic flux shielding member 122 described above is illustrated in FIG. 6A.

In FIG. 6B, reference numeral 1300 indicates a magnetic flux generated between the magnet 311a and the magnet 351a. An arrow in the magnetic flux 1300 indicates the direction of the magnetic flux. A line vertically extending on the right side of the figure is an exterior surface 100a of the camera, and the right side of the exterior surface 100a is the outside of the camera. The magnetic flux 1300 generated from the magnet 351a leaks to the outside through the exterior surface 100a of the camera and, then goes to the magnet 311a in the camera, and the magnetic flux from the magnet 311a reaches the opposite magnet 351a. The magnetic flux generated in the opposite direction of a centerline 1001 of the magnets 311a and 351a and goes to the direction opposite to the magnetic flux 1300 is not illustrated. Thus, in the conventional camera, the magnetic flux 1300 forming the magnetic field between the magnets 311a and 351a leaks to the outside of the camera.

On the other hand, in FIG. 6A, the magnetic flux shielding member 122 is disposed in an area between the magnets 311a and 351a (image stabilizing unit 104) and the exterior surface 100a of the camera 100, through which the magnetic flux 1300 generated from the magnet 351a toward the outside of the camera 100 passes, and the magnetic flux shielding member 122 attracts (shields) the magnetic flux 1300 directed to the outside of the camera 100. This configuration can keep the magnetic flux 1300 inside the camera 100 and prevent the magnetic flux 1300 from leaking out of the camera 100.

Figure 7:
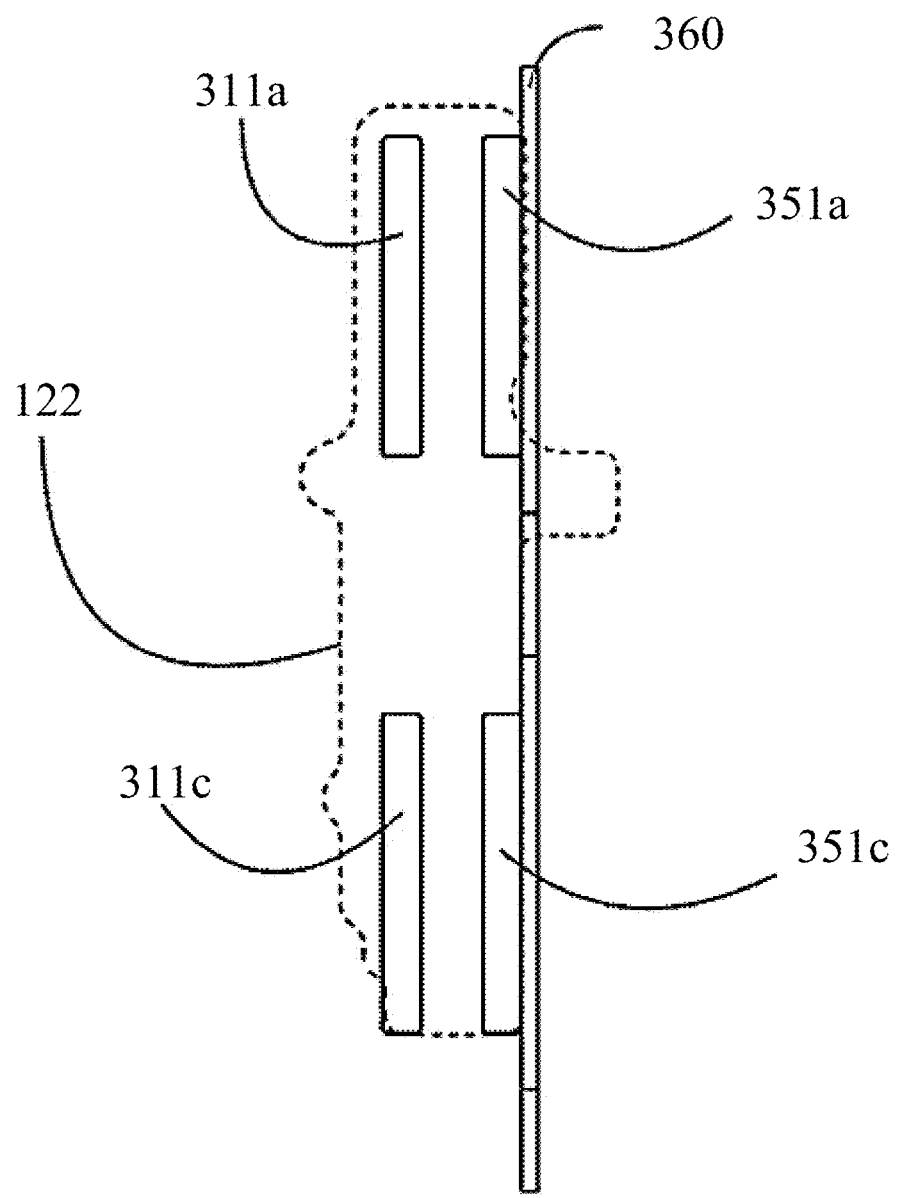
FIG. 7 illustrates a relationship between a magnet and a thin plate member in the camera according to the embodiment.

FIG. 7 illustrates the magnetic flux shielding member 122 (illustrated by a broken line) and the magnets 311a, 311c, 351a, and 351c viewed from the direction of arrow A (exterior surface side) illustrated in FIG. 4A. As can be seen from FIGS. 6A and 7, the magnetic flux shielding member 122 has a flat part disposed parallel to the side end surfaces of the magnets 311a, 311c, 351a, and 351c (or an end surface that does not face the coil of each magnet and does not contact the yoke) and the exterior surface of the camera 100. In other words, the magnetic flux shielding member 122 is disposed so as to be orthogonal to the sensor moving plane. This configuration can effectively prevent the magnetic flux from leaking from the exterior surface of the camera 100 near the magnets 311a, 311c, 351a, and 351c.

The magnetic flux shielding member 122 is disposed so as to cover the side end surfaces of the magnets 311a, 311c, 351a, and 351c. Thereby, even if the plate thickness of the magnetic flux shielding member 122 is made thinner, the magnetic flux 1300 can be efficiently attracted, and the size of the camera 100 can be prevented from increasing. The magnetic flux shielding member 122 may cover most of the side end surfaces of the magnets 311a, 311c, 351a, and 351c rather than covering all of them.

The magnetic flux shielding member 122 is disposed in an area close to the connector 8 so as to be parallel to the connection opening surface of the connector 8. This configuration can prevent magnetic foreign matters from being attracted to the camera 100 from the inside of the connector 8 and its peripheries when the connector cover 5 opens.

The magnetic flux shielding member 122 is disposed outside the moving area of the movable part 104a, and disposed at a position where it does not interfere with the moving movable part 104a or does not influence the magnetic flux necessary for driving the movable part 104a. The magnetic flux shielding member 122 is held so as to always keep a constant distance from the magnets 311a, 311c, 351a, 351c regardless of the position of the movable part 104a. In this embodiment, it is attached to the side surface of the heat diffusing member 121. Thereby, magnetic flux leakage can always be suppressed regardless of the position of the movable part 104a.

This embodiment provides the magnetic flux shielding member 122 between the magnets 311a, 311c, 351a, and 351c of the image stabilizing unit 104 and the outer surface of the camera 100, restrains the magnetic flux from leaking to the outside of the camera 100, and prevents the magnetic foreign matters from being attracted to the outer surface of the camera 100 or from being attracted to the camera 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-170236, filed on Sep. 19, 2019, which is hereby incorporated by reference herein in its entirety.

What is claimed is:

1. An image pickup apparatus comprising:
   an image sensor configured to capture an object image;
   an image stabilizing unit that includes a coil, a magnet that faces the coil, and a yoke that contacts the magnet, and moves the image sensor for an image stabilization by electrifying the coil; and
   a magnetic flux shielding member made of a magnetic material and disposed in an area between the image stabilizing unit and an exterior surface of the image pickup apparatus, through which a magnetic flux generated from the magnet moves toward outside of the image pickup apparatus,
   wherein the magnetic flux shielding member is disposed between the exterior surface and an end surface of the magnet which does not face the coil and does not contact the yoke.

2. The image pickup apparatus according to claim 1, wherein the magnetic flux shielding member includes a flat part disposed parallel to the end surface of the magnet and the exterior surface.

3. The image pickup apparatus according to claim 1, wherein the magnetic flux shielding member is disposed so as to cover the magnet when viewed from an exterior surface side.

4. The image pickup apparatus according to claim 1, wherein the image pickup apparatus includes an external connection terminal, and the magnetic flux shielding member is disposed in an area close to the external connection terminal.

5. The image pickup apparatus according to claim 4, wherein the magnetic flux shielding member is disposed parallel to the connection opening surface of the external connection terminal.

6. The image pickup apparatus according to claim 1, wherein the magnetic flux shielding member is disposed outside a moving range of a movable part including the image sensor in the image stabilizing unit.

7. An image pickup apparatus comprising:
   an image sensor configured to capture an object image;
   an image stabilizing unit that includes a coil, a magnet that faces the coil, and a yoke that contacts the magnet, and moves the image sensor for an image stabilization by electrifying the coil; and
   a magnetic flux shielding member made of a magnetic material and disposed in an area between the image stabilizing unit and an exterior surface of the image pickup apparatus, through which a magnetic flux generated from the magnet moves toward outside of the image pickup apparatus,
   wherein the magnetic flux shielding member is disposed so as to be orthogonal to a plane in which the image sensor moves.

8. An image pickup apparatus comprising:
   an image sensor configured to capture an object image;
   an image stabilizing unit that includes a coil, a magnet that faces the coil, and a yoke that contacts the magnet, and moves the image sensor for an image stabilization by electrifying the coil; and
   a magnetic flux shielding member made of a magnetic material and disposed in an area between the image stabilizing unit and an exterior surface of the image pickup apparatus, through which a magnetic flux generated from the magnet moves toward outside of the image pickup apparatus,
   wherein the magnetic flux shielding member is disposed outside a moving range of a movable part including the image sensor in the image stabilizing unit, and
   wherein the magnetic flux shielding member is disposed so as to maintain a constant distance from the magnet regardless of a movement of the movable part.

9. An image pickup apparatus comprising:
   an image sensor configured to capture an object image;
   an image stabilizing unit that includes a coil, a magnet that faces the coil, and a yoke that contacts the magnet, and moves the image sensor for an image stabilization by electrifying the coil;
   a magnetic flux shielding member made of a magnetic material and disposed in an area between the image stabilizing unit and an exterior surface of the image pickup apparatus, through which a magnetic flux generated from the magnet moves toward outside of the image pickup apparatus; and
   a heat diffusing member disposed between the image stabilizing unit and an electric circuit board,
   wherein the magnetic flux shielding member is attached to the heat diffusing member.

10. An image pickup apparatus comprising:
    an image sensor configured to capture an object image;
    an image stabilizing unit that includes a coil, a magnet that faces the coil, and a yoke that contacts the magnet, and moves the image sensor for an image stabilization by electrifying the coil;
    a magnetic flux shielding member made of a magnetic material and disposed in an area between the image stabilizing unit and an exterior surface of the image pickup apparatus, through which a magnetic flux generated from the magnet moves toward outside of the image pickup apparatus; and
    a heat diffusing member disposed between the image stabilizing unit and an electric circuit board, wherein the magnetic flux shielding member is grounded via the heat diffusing member.

11. An image pickup apparatus comprising:
an image sensor configured to capture an object image;
an image stabilizing unit that includes a coil, a magnet that faces the coil, and a yoke that contacts the magnet, and moves the image sensor for an image stabilization by electrifying the coil; and
a magnetic flux shielding member made of a magnetic material and disposed in an area between the image stabilizing unit and an exterior surface of the image pickup apparatus, through which a magnetic flux generated from the magnet moves toward outside of the image pickup apparatus,
wherein the magnetic flux shielding member is grounded, and
wherein the magnetic flux shielding member is disposed between the exterior surface and an end surface of the magnet which does not face the coil and does not contact the yoke.

12. An image pickup apparatus comprising:
an image sensor configured to capture an object image;
an image stabilizing unit that includes a coil, a magnet that faces the coil, and a yoke that contacts the magnet, and moves the image sensor for an image stabilization by electrifying the coil; and
a magnetic flux shielding member made of a magnetic material and disposed in an area between the image stabilizing unit and an exterior surface of the image pickup apparatus, through which a magnetic flux generated from the magnet moves toward outside of the image pickup apparatus,
wherein the magnetic flux shielding member is grounded,
wherein the magnetic flux shielding member is disposed outside a moving range of a movable part including the image sensor in the image stabilizing unit, and
wherein the magnetic flux shielding member is disposed so as to maintain a constant distance from the magnet regardless of a movement of the movable part.

* * * * *